United States Patent Office 2,739,167
Patented Mar. 20, 1956

2,739,167

STABILIZED, OIL-SOLUBLE VITAMINS AND PROCESS OF PREPARING THE SAME

John B. Conn, Westfield, N. J., assignor to Merck & Co., Inc., Rahway, N. J., a corporation of New Jersey No Drawing. Application January 22, 1953, Serial No. 332,767

10 Claims. (Cl. 260—488)

This invention is concerned generally with vitamin preparations. More particularly it relates to an improved preparation of oil-soluble vitamins such as vitamin A acetate having a stabilizing coating, as well as a novel process for making said preparation.

Crystalline vitamin A acetate as well as many other oil soluble vitamin compounds are unstable under ordinary conditions, and may lose their potency completely in as little as two days. Various methods have been proposed to combat this tendency in vitamins of the oil-soluble type, including the use of protective coatings, but such methods and their products have not been entirely satisfactory.

A general purpose of this invention is to provide a novel and improved process for stabilizing oil-soluble vitamins and, in particular, vitamin A acetate by applying a protective coating. A feature is the production of the coating material by the reaction of constituents in which particles of the vitamin are present, so that the particles are coated in the same operation as that in which the coating material is formed.

A further object is to provide a pulverulent oil-soluble vitamin preparation having a novel stabilizing coating, and more specifically a coating of a protein-like substance formed by the reaction of a peptic digest of a protein in the presence of an enzyme, for example, the action of chymotrypsin on a peptic digest of egg albumen. Products of this type can be made according to the invention which contain a higher proportion of the vitamin than prior stabilized preparations containing the vitamin.

The protein-like material is synthesized by the reaction which occurs in peptic digests of proteins such as egg and bovine albumen, fibrin and zein, in the presence of an enzyme, and particularly of chymotrypsin. Egg albumen has been found to be especially suitable. In this operation the powdered vitamin compound is mixed with a solution of the peptic digest, and the latter reacts in the presence of the enzyme under conditions that produce a gelated protein-like substance which forms a stabilizing coating on the vitamin particles.

In a preferred embodiment of my invention wherein the oil-soluble vitamin utilized is vitamin A acetate, there is obtained as the end product a dry powder which may contain as much as 50% by weight of the crystalline vitamin A acetate, a proportion markedly higher than has heretofore been obtainable. X-ray diffraction studies have shown that the vitamin A acetate in this product is crystalline, while particles of the same vitamin coated by prior processes have proved to be amorphous. Vitamin samples made according to this invention and kept in air at room temperatures have shown no loss of potency after two months.

In carrying out the process the peptic digest of the protein is first prepared. In the preferred method, flake egg albumin is digested with pepsin at pH 1.6 and 37° C. in the presence of a small amount of toluene for about a week, concentrated hydrochloric acid being added as needed to maintain said pH value. The resulting peptic digest is clarified by filtration, neutralized to about pH 8.6 with Amberlite IR–4B resin (which is a weakly basic anion-exchange material), concentrated in vacuo to about half its volume, and freeze-dried to produce a dry egg albumen digest ready for use in the subsequent reaction.

This digest is then combined with the powdered oil-soluble vitamin and reacted in the presence of an enzyme to form a coating, an operation referred to herein as an enzyme reaction. In the preferred form, an approximately 50% aqueous solution of said digest is acidified to a pH value between 7.0 and 7.6, preferably between 7.2 and 7.3, with hydrochloric acid, and the desired amount of crystallized vitamin A acetate is added, together with a small amount of chymotrypsin. While any practicable vitamin particle size may be used, it is advantageous from a stability standpoint to use crystals that will pass through a 100 mesh screen. Crystals of this size are desirably obtained by grinding the vitamin with solid carbon dioxide, which keeps the vitamin chilled and somewhat protected from air, thereby minimizing loss of potency. The proportion of vitamin A acetate introduced into the mixture is determined by the desired potency of the product.

The resulting dispersion is placed in a container thermostatically maintained between 35° C. and 40° C., preferably at 37° C., until solidification or gelation takes place, which will occur in from one to six hours, ordinarily in four to six hours. The resulting protein-like material should be allowed to form and coat the vitamin particles until the whole reaction mass is gelatinous, and more specifically is beyond the consistency at which pouring is possible.

It is emphasized that in accordance with this invention the synthetic protein-like coating material forms as a result of the reaction as a thick gel, a solid or semi-solid mass, which results in uniform coating of the vitamin particles. Processes in which protein-like material precipitates out are not satisfactory, as the precipitate does not coat the vitamin.

The gelated mass is freeze-dried to produce a light powder, which consists of oil-soluble vitamin, as for example crystalline vitamin A acetate, stabilized by a coating of the protein-like material, which is an enzyme reaction product of a peptic digest of a protein.

In the enzyme-catalyzed reaction of the peptic digest, it is known that particular enzymes are active only within certain specific temperature limits and pH ranges, the required conditions varying with different enzymes; and it is understood that when enzymes other than chymotrypsin are used, appropriate temperatures and pH values will be substituted for those given herein.

The following examples illustrate specific methods of putting the invention into practice; but it is to be understood that these examples are given by way of illustration and not of limitation.

*Example 1*

A dry peptic digest of egg albumen is prepared in the manner described above, mixed with sufficient water to form a solution containing 460 milligrams of the digest per milliliter, and is adjusted to pH 7.3 with hydrochloric acid. Ten milliliters of this solution are thoroughly mixed with three grams of crystalline vitamin A acetate that has been ground to pass a 100 mesh screen. This mixture is transferred to a 100 milliliter round-bottom flask containing 4 milligrams of crystalline chymotrypsin in 0.4 milliliters of water and placed in a bath maintained at 37° C. After four and one-half hours the stiffened mixture is removed from the bath and freeze-dried to produce a light yellowish powder, which is stabilized vitamin A acetate.

*Example 2*

Ten milliliters of an aqueous solution of peptic digest of egg albumen containing three grams of crystallized vitamin A acetate, prepared as in Example 1, is treated with four milligrams of chymotrypsin and vigorously vibrated for fifteen minutes on a paint mixer to produce uniform dispersion of the vitamin A acetate. The mixture is maintained at 37° C. for five and one-half hours, the resulting mass being then freeze-dried to produce pulverent coated stable vitamin A acetate.

While a description of the invention and examples thereof have been given, it is to be understood that the invention includes such modifications and variations thereof as come within the scope of the claims.

I claim:

1. A dry stabilized vitamin preparation comprising crystalline particles of an oil-soluble unstable vitamin and a stabilizing coating on each particle comprising synthetic protein-like material produced by a chymotrypsin catalyzed reaction of a peptic digest of protein.

2. A dry stabilized vitamin A acetate preparation comprising crystalline particles of vitamin A acetate and a stabilizing coating on each particle comprising synthetic protein-like material produced by a chymotrypsin catalyzed reaction of a peptic digest of protein.

3. A dry stabilized vitamin A preparation comprising crystalline particles of vitamin A and a stabilizing coating on each particle comprising synthetic protein-like material produced by a chymotrypsin catalyzed reaction of a peptic digest of protein.

4. A dry stabilized vitamin preparation comprising crystalline particles of an oil-soluble unstable vitamin and a stabilizing coating on each particle comprising synthetic protein-like material produced by a chymotrypsin catalyzed reaction of a peptic digest of egg albumen.

5. A dry stabilized vitamin A acetate preparation comprising crystalline particles of vitamin A acetate and a stabilizing coating on each particle comprising synthetic protein-like material produced by a chymotrypsin catalyzed reaction of a peptic digest of egg albumen.

6. A dry stabilized vitamin A acetate preparation comprising crystalline particles of vitamin A acetate having a particle size not greater than 100 mesh, and a stabilizing coating on each particle comprising a synthetic protein-like material produced by a chymotrypsin catalyzed reaction of a peptic digest of egg albumen.

7. A process for the production of stabilized crystalline vitamin A which comprises preparing an aqueous solution of a peptic digest of protein, mixing crystalline particles of vitamin A with the solution, producing a reaction in said digest by adding chymotrypsin and thereby producing a synthetic protein-like material in the form of a gel coating the particles, and drying the resultant mixture, thereby producing dry stabilized coated crystalline vitamin A.

8. A process for the production of stabilized crystalline vitamin A acetate which comprises preparing an aqueous solution of a peptic digest of a protein, mixing pulverized crystalline particles of vitamin A acetate with the solution, producing a reaction in said digest by adding chymotrypsin and thereby producing a synthetic protein-like material in the form of a gel coating the particles, and drying the resultant mixture, thereby producing dry stabilized coated crystalline vitamin A acetate.

9. A process for the production of stabilized crystalline vitamin A acetate which comprises preparing an aqueous solution of a peptic digest of egg albumen, mixing pulverized crystalline particles of vitamin A acetate with the solution, adding chymotrypsin to said solution, thereby producing a reaction in said digest and a resulting synthetic protein-like material in the form of a gel coating the acetate, and drying the resulting mixture, thereby producing dry stabilized coated crystalline vitamin A acetate.

10. A process for the production of stabilized crystalline vitamin A acetate which comprises preparing an aqueous solution of a peptic digest of a protein, adjusting the pH value to a value between 7.0 and 7.6, mixing pulverized crystalline particles of vitamin A acetate with the solution, adding chymotrypsin to said solution and maintaining the mixture at a temperature between 35° C. and 40° C. until said mixture is no longer fluid, thereby producing a synthetic protein-like material in the form of a gel coating the acetate, and drying and pulverizing the resulting mixture, thereby producing dry stabilized crystalline vitamin A acetate.

References Cited in the file of this patent

UNITED STATES PATENTS

| | | |
|---|---|---|
| 2,218,592 | Taylor | Oct. 22, 1940 |
| 2,562,840 | Caldwell | July 31, 1951 |
| 2,643,209 | Goett | June 23, 1953 |

OTHER REFERENCES

Sumner: Chem. & Method of Enzymes, Academic (1943), p. 142.

Charkey: Chem. Abstracts 42, 2030–31 (1948).